US006942171B1

(12) United States Patent
Chang

(10) Patent No.: US 6,942,171 B1
(45) Date of Patent: Sep. 13, 2005

(54) FISHING REEL

(76) Inventor: Liang-Jen Chang, 132, Fu-i Road, Taiping (TW)

( * ) Notice: Subject to any disclaimer, the term of this patent is extended or adjusted under 35 U.S.C. 154(b) by 0 days.

(21) Appl. No.: 10/844,310

(22) Filed: May 13, 2004

(51) Int. Cl.[7] .............................................. A01K 89/15
(52) U.S. Cl. ..................................................... 242/261
(58) Field of Search ............................... 242/259, 260, 242/261, 271; 192/66.1, 66.21, 70.14

(56) References Cited

U.S. PATENT DOCUMENTS

| 1,402,811 | A |   | 1/1922  | Upton    |         |
|-----------|---|---|---------|----------|---------|
| 2,923,951 | A | * | 2/1960  | Beavis   | 470/188 |
| 4,738,410 | A | * | 4/1988  | Yamaguchi| 242/271 |
| 5,123,609 | A | * | 6/1992  | Noda     | 242/261 |
| 5,362,010 | A | * | 11/1994 | Takamatsu| 242/261 |
| 5,746,381 | A | * | 5/1998  | Miyazaki | 242/261 |
| 5,791,576 | A | * | 8/1998  | Miyazaki | 242/261 |
| 5,904,310 | A | * | 5/1999  | Miyazaki | 242/260 |
| 6,270,028 | B1| * | 8/2001  | Kim et al.| 242/262|
| 6,402,073 | B1| * | 6/2002  | Datcuk, Jr.| 242/270|
| 6,412,719 | B1| * | 7/2002  | Hyon     | 242/260 |
| 6,505,787 | B1| * | 1/2003  | Nilsen   | 242/255 |

* cited by examiner

*Primary Examiner*—Kathy Matecki
*Assistant Examiner*—Evan Langdon
(74) *Attorney, Agent, or Firm*—Browdy and Neimark, P.L.L.C.

(57) ABSTRACT

A fishing reel has a spool with a spindle and the spindle has a retaining portion to be engaged and disengaged with a slot of a gear rod. The retaining portion is provided with two guiding faces. While the spool is rotating in high speed, the retaining portion has its distal end running into the slot by the guiding faces first. And, while the spool rotates continuously to a predetermined angle, the retaining portion totally moves into the slot. The fishing reel can stop the spool while the spool is rotating in high speed and to prevent the spindle and the gear rod from damage.

3 Claims, 5 Drawing Sheets

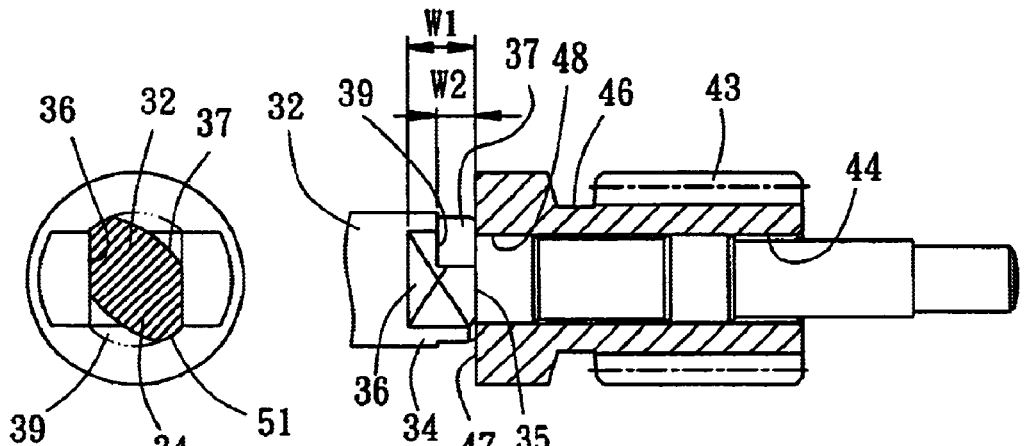
FIG. 5    FIG. 4
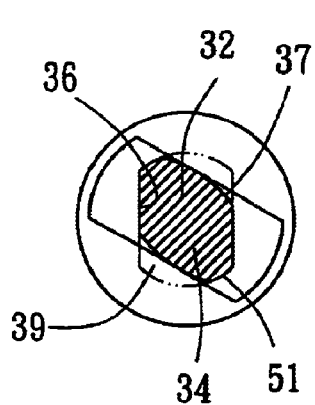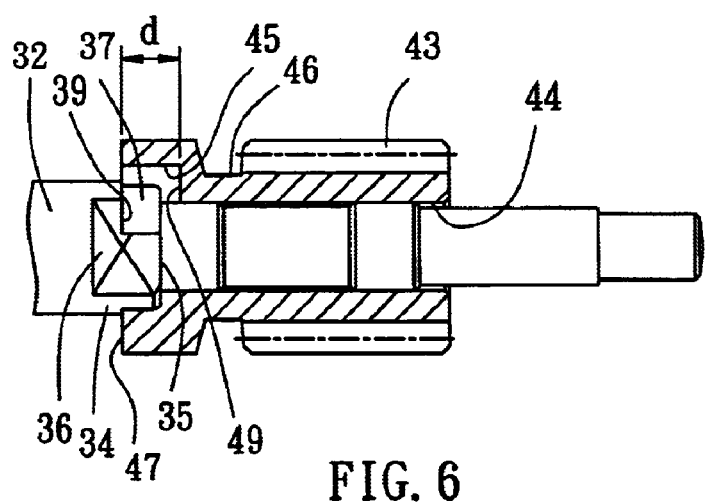
FIG. 7    FIG. 6
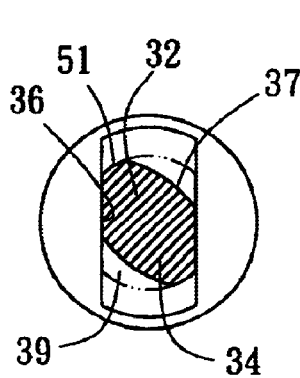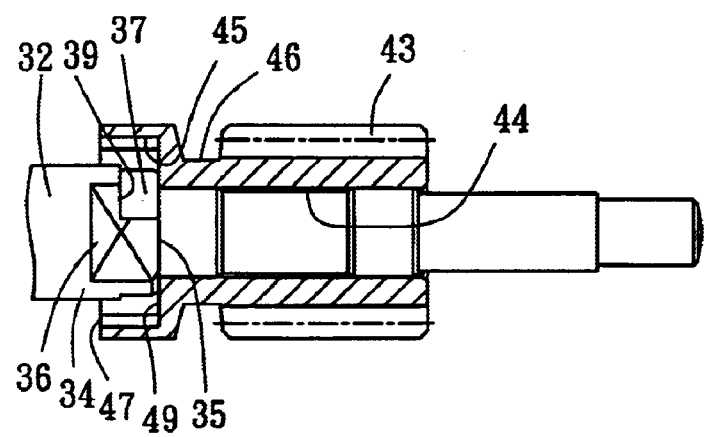
FIG. 9    FIG. 8

US 6,942,171 B1

FISHING REEL

BACKGROUND OF THE INVENTION

1. Field of the Invention

The present invention relates generally to a fishing tool, and more particularly to a fishing reel, which facilitates stopping of the spool while the fishing line is being released at high speed.

2. Description of the Related Art

FIG. 10 shows a conventional fishing reel 1, which has a spool 2, a spindle 3 provided to the spool 2 and a gear rod 4. The spindle 3 has a retaining portion 5. The gear rod 4 has a hole 6 through which the spindle 3 extends and a slot 7 to be engaged with the retaining portion 5. The gear rod 4 is moved by a clutch device (not shown) to be engaged and disengaged with the retaining portion 5. The spool 2 rotates independently while the slot 7 of gear rod 4 is disengaged with the retaining portion 5 and the spool 2 rotates along with gear rod 4 while the slot 7 of gear rod 4 is engaged with the retaining portion 5.

A new way of fishing uses live fish for bait. While the bait fish swims, the line is pulled very fast from the spool that drives the spool 2 rotating in high speed. While the line is pulled for a desirable length, the clutch device moves the slot 7 of gear rod 4 to engage with the retaining portion 5 of the spindle 3 to stop the spool 2 so that the line can not be pulled anymore. The retaining portion 5 of the spindle 3 has a shape meeting the slot 7 of gear rod 4, so that only the longitudinal axes of the retaining portion 5 and the slot 7 are oriented at exactly the same direction, the retaining portion 5 might be engaged with the slot 7. While the spool 2 is rotating at high speed, it is very hard to engage the retaining portion 5 with the slot 7. The retaining portion 5 might only be smoothly engaged with the slot 7 while the bait fish swims slow. That is very inconvenient to the fishers. In addition, the retaining portion 5 might only have a little section engaged with the slot 7 while the spindle 3 rotating fast. This can result in damage to the spindle 3 and the gear rod 4.

SUMMARY OF THE INVENTION

The primary objective of the present invention is to provide a fishing reel capable of stopping the spool while the line is released in high speed.

The secondary objective of the present invention is to provide a fishing reel capable of preventing the spindle and the gear rod from damage.

According to the objectives of the present invention, a fishing reel comprises a reel body, a spool, a handle, a transmission device and a clutch device. The spool is pivoted on the reel body through a spindle, the spindle has a retaining portion. The transmission device has a first end to be coupled with the handle and a second end to be coupled with the spindle for transferring power imported by a user from the handle to the spool. The transmission device has a gear rod at the second end thereof. The gear rod has a hole through which the spindle extends and a slot having two opposite sidewalls to be engaged and disengaged with the retaining portion of the spindle. The clutch device for moving the gear rod between a first position, in which the slot of the gear rod is disengaged with the retaining portion of the spindle, and a second position, in which the slot of the gear rod is engaged with the retaining portion of the spindle. The retaining portion of the spindle has two contact faces and two guiding faces that are provided respectively at opposite sides of the retaining portion and adjoined to the contact faces respectively, wherein the contact faces are respectively attached on the sidewalls of the slot while the retaining portion and the slot are engaged.

BRIEF DESCRIPTION OF THE DRAWINGS

FIG. 4 is a sectional view in parts of the preferred embodiment of the present invention, showing the first action thereof;

FIG. 5 is a left view of FIG. 4;

FIG. 6 is a sectional view in parts of the preferred embodiment of the present invention, showing the second action thereof;

FIG. 7 is a left view of FIG. 6;

FIG. 8 is a sectional view in parts of the preferred embodiment of the present invention, showing the third action thereof;

FIG. 9 is a left view of FIG. 8, and

DETAILED DESCRIPTION OF THE INVENTION

Figure 1:
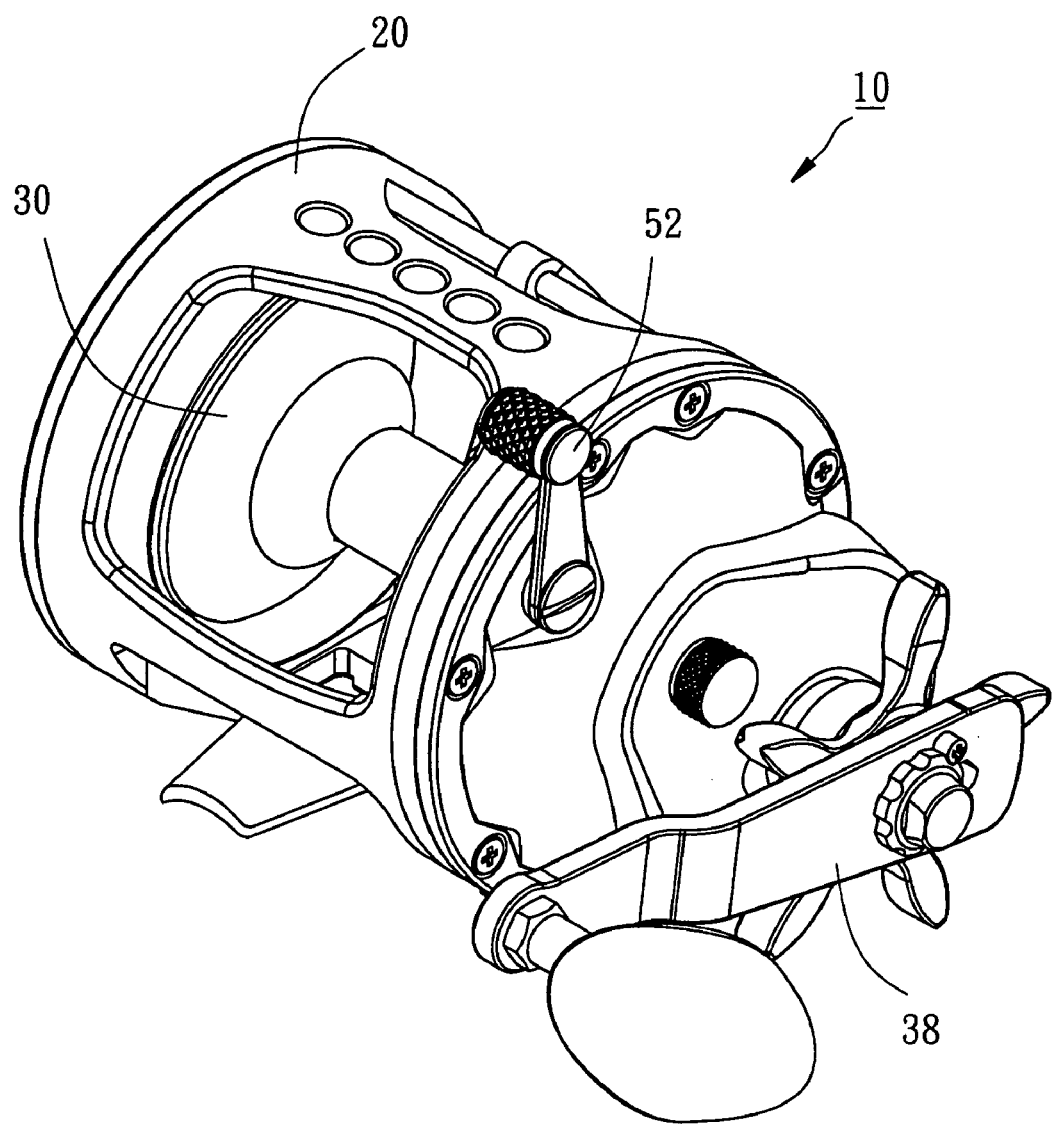
FIG. 1 is a perspective view of a preferred embodiment of the present invention.
Figure 2:
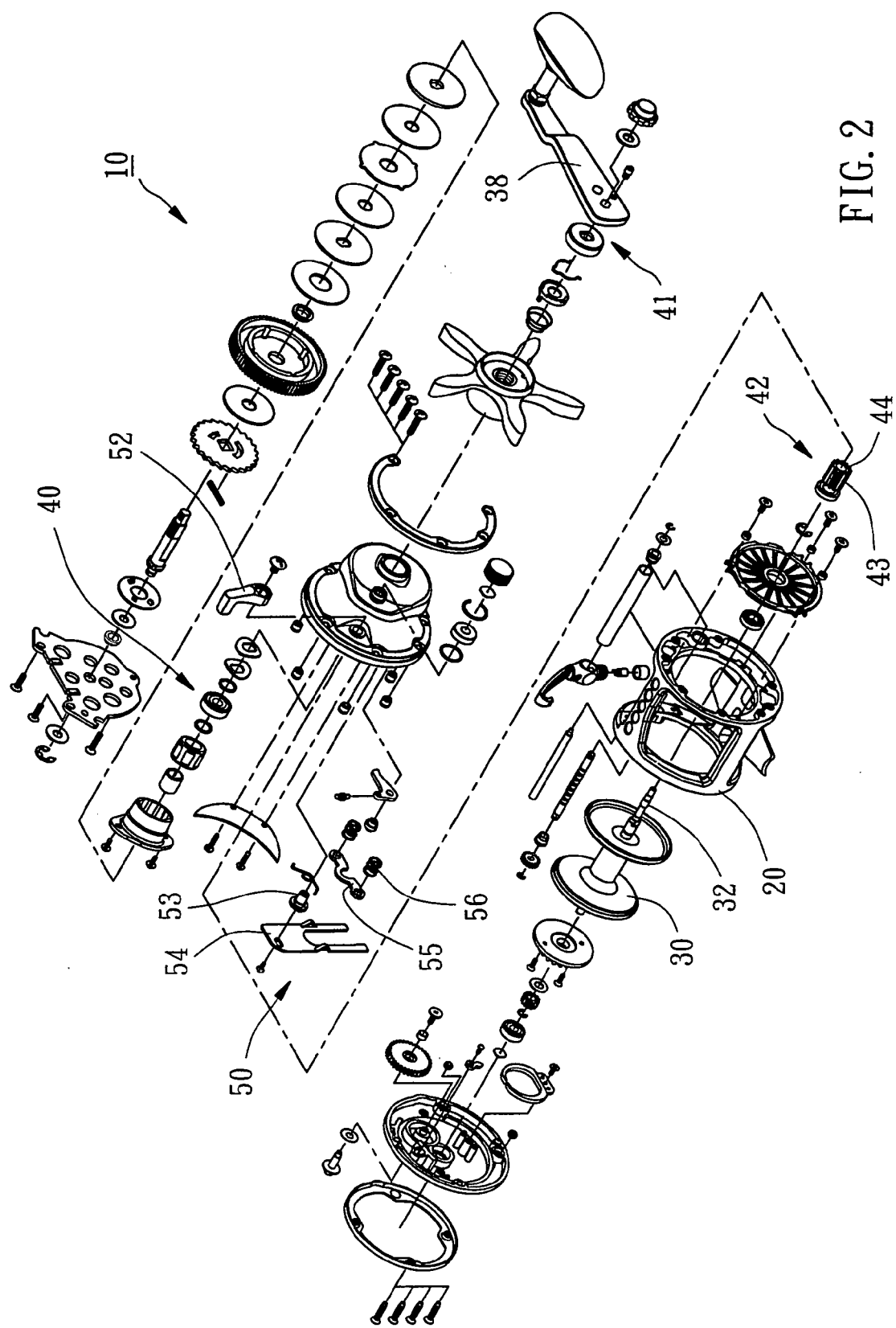
FIG. 2 is an exploded view of the preferred embodiment of the present invention.
Figure 3:
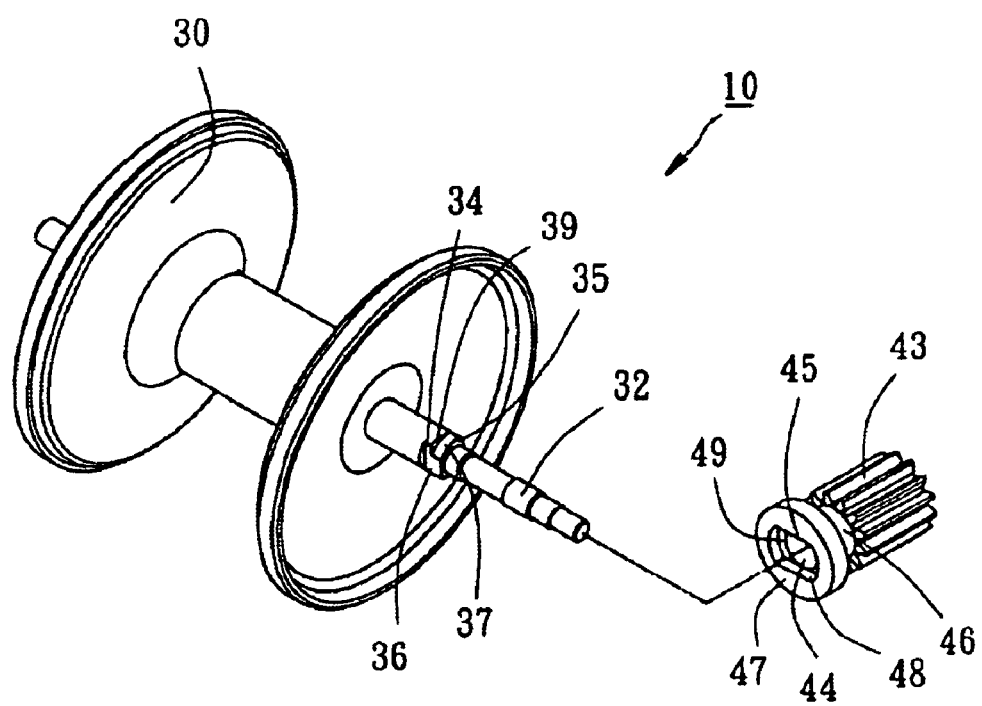
FIG. 3 is an exploded view in parts of the preferred embodiment of the present invention.
Figure 10:
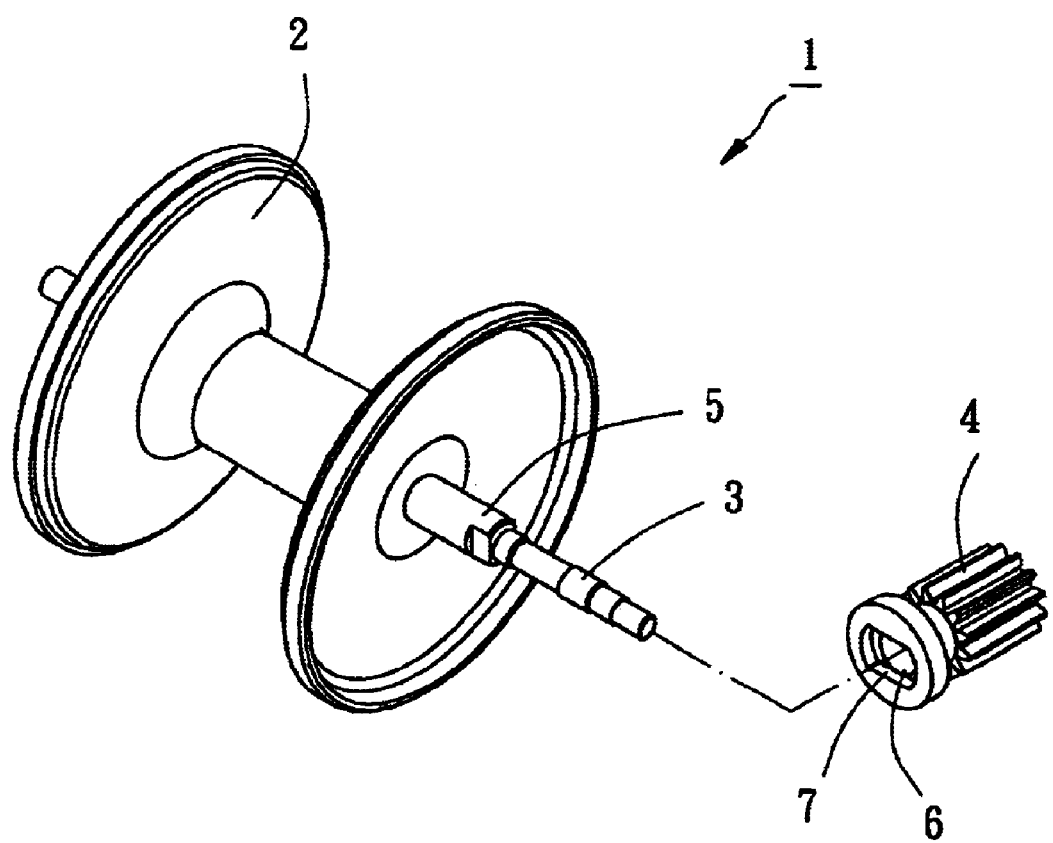
FIG. 10 is an exploded view in parts of the conventional fishing reel.

As shown in FIGS. from FIG. 1 to FIG. 3, a fishing reel 10 of the preferred embodiment of the present invention comprises a reel body 20, a spool 30, a handle 38, a transmission device 40 and a clutch device 50.

The spool 30 has a spindle 32 running therethrough and the spindle 32 is coupled with the reel body 20 to rotate the spool 30 in the reel body 20. The spool 30, therefore, rotates freely relative to the reel body 20. A fishing line (not shown) is wound on the spool 30. The spindle 32 is provided with an elongated retaining portion 34 on which has an edge face 35, two contact faces 36 at opposite sides thereof and two curved guiding faces 37 beside the contact faces 36 respectively and adjoined thereto by cylindrical portion 51. As shown in FIG. 4, the contact faces 36 have a first width w1 and the guiding faces 37 have a second width w2, wherein the first width w1 is greater than the second width w2. The guiding faces 37 are connected to the edge face 35 at sides thereof and have a shoulder face 39 respectively at the other sides thereof.

The transmission device 40 is provided in the reel body 20, which has a first end 41 coupled with the handle 38 and a second end 42 coupled with the spindle 32. The handle 38 drives the spool 30 for rotation via the transmission device 40. The transmission device 40 is provided with a gear rod 43 at the second end 42 thereof. The gear rod 43 has a hole 44 through which the spindle 32 extends, a slot 45 to be engaged with the retaining portion 34 of the spindle 32 and an annular recess 46 to be engaged with the clutch device 50. The gear rod 43 has an original face 47 at an end thereof and the slot 45 has a depth d from the original face 47. As shown in FIG. 6, the slot 45 has two opposite planar sidewalls 48 and a bottom 49.

The clutch device 50 has a shaft 52 provided on the reel body 20, a cam 53 connected to the shaft 52, a gate plate 54 to be driven by the cam 53 for movement up and down, a movable plate 55 to be engaged with the annular recess 46 of the gear rod 43 and to be attached on the gate plate 54 and two springs 56 mounted between the reel body 20 and the movable plate 54. When the user moves the shaft 52, the movable plate 55 is pushed by the gate plate 54 or the spring 56 to reciprocate along the spindle 32. The clutch device 50 is a conventional device that is not described in detail here. The reciprocation of the movable plate 55 drives the gear rod 43 to move between a first position and a second position. When the gear rod 43 is moved to the first position, the gear rod 43 is disengaged with the retaining portion 34 of the spindle 32 to let the spool 30 rotates freely. When the gear rod 43 is moved to the second position, the gear rod 43 is engaged with the retaining portion 34 of the spindle 32 and the spool 30 is stopped or to be driven by the transmission device 40 for rotation.

When the user wants to release the line, he/she just moves the shaft 52 to disengage the gear rod 43 with the retaining portion 34 of the spindle 32 via the movable plate 55 that permits the spool 30 to rotate freely to allow the line to be continuously drawn out. In this condition, the gear rod 43 is positioned at the first position.

When the user wants to stop the release of the line, he/she moves the shaft 52 back. In such condition, the springs 56 force the movable plate 55 to move the gear rod 43 toward the retaining portion 34 of the spindle 32 as shown in FIG. 4 and FIG. 5. In the meantime, the original face 47 of the gear rod 43 is engaged on the edge face 35 of the retaining portion 34. When the spindle 32 rotates along with the spool 30 to a predetermined angle, as shown in FIG. 6 and FIG. 7, the gear rod 43 moves a predetermined distance w2, toward the retaining portion 34 by the guiding faces 37 that causes the original face 47 to engage on the shoulder face 39. While the spindle 32 further rotates another predetermined angle, as shown in FIG. 8 and FIG. 9, the gear rod 43 moves toward the retaining portion 34 further for another predetermined distance d-w2, to let the retaining portion 34 engage in the slot 45. In the meantime, the edge face 35 of the retaining portion 34 is engaged on the bottom 49 of the slot 43 and the gear rod 43 is positioned at the second position. The sidewalls 48 of the slot 45 are engaged on the contact faces 36 of the retaining portion 34. The spindle 32, therefore, is stopped by the gear rod 43, so that user can turn the handle 38 to rotate the spool 30 for drawing the line back.

In other words, while the spool 30 and the spindle 32 are rotating at high speed, the edge face 35 of the retaining portion 34 can be disengaged from the original face 47 of the gear rod 43 by the guiding faces 37. The gear rod 43 also is moved forward by the springs 56 to force a distal section of the retaining portion 34 to move into the slot 45. After the spindle 32 has rotated to the position shown in FIG. 9, the contact faces 36 of the retaining portion 34 engage the sidewalls 48 of the slot 45 and the springs 56 move the gear rod 43 further via the movable plate 55 that moves the retaining portion 34 into total engagement with the slot 45 to couple the gear rod 43 with the spindle 32.

As a result, there is more time and space for engaging the retaining portion 34 of the spindle 32 with the slot 45 of the gear rod 43, so that the gear rod 43 can be coupled with the spindle 32 easily even when the spool 30 is rotating at high speed. It has sufficient time for the retaining portion 34 to be engaged with the slot 45, i.e. there is a sufficient path for the retaining portion 34 to move into the slot 45 before the contact faces 36 of the retaining portion 34 of the spindle 32 contact the sidewalls 48 of the slot 45 of the gear rod 43, so that the gear rod 43 and the spindle 32 are not easy to be damaged while in engagement and disengagement.

It is noted that the second width w2 of the guiding faces 37 can be smaller than, equal to or greater than the first width w1. The size and the curvature of the guiding faces are the choice of the manufacturers. The guiding face can also be flat.

What is claimed is:

1. A fishing reel, comprising:
a reel body;
a spool rotatable in the reel body by a spindle, the spindle having a rotational axis and a retaining portion;
a handle;
a transmission device having a first end coupled with the handle and a second end coupled with the spindle for transferring power imparted by a user from the handle to the spool, wherein the transmission device has a gear rod at the second end thereof, the gear rod having a hole through which the spindle extends and a slot having two opposite sidewalls to be engaged and disengaged with the retaining portion of the spindle; and
a clutch device for moving the gear rod during rotation between a first position where the slot of the gear rod is disengaged from the retaining portion of the spindle, and a second position where the slot of the gear rod is engaged with the retaining portion of the spindle;
wherein the retaining portion of the spindle has two planar contact faces extending parallel to the rotational axis of the spindle, a cylindrical surface concentric with the rotational axis which connects the two planar contact faces and two guiding faces extending parallel to the rotational axis that are provided respectively at opposite sides of the retaining portion and respectively connect the contact faces;
wherein the sidewalls of the slot first respectively and slidably engage the guiding faces and thereafter respectively and fixedly engage the contact faces to rotate the spool as the gear rod moves along the direction of the rotational axis to fully engage the retaining portion.

2. The fishing reel as defined claim 1, wherein the contact faces have a first width and the guiding faces have a second width and the first width is greater than or equal to the second width.

3. The fishing reel as defined in claim 1, wherein each of the guiding faces has a curved face, a transverse end of which connects to the cylindrical surface.

* * * * *